United States Patent
Kopel

[19]

[11] Patent Number: 6,078,729
[45] Date of Patent: Jun. 20, 2000

[54] FOAM, DRAIN AND FILL CONTROL SYSTEM FOR HUMIDIFIER

[75] Inventor: Zev Kopel, Dollard des Ormeaux, Canada

[73] Assignee: National Environmental Products Ltd., Inc., Fla.

[21] Appl. No.: 08/954,794

[22] Filed: Oct. 21, 1997

[51] Int. Cl.[7] .................................. F24F 3/14; F22B 1/30
[52] U.S. Cl. .......................... 392/402; 392/324; 392/327
[58] Field of Search .................................... 392/324, 325, 392/326, 327, 333, 334, 400, 401, 402, 403; 261/139, 142, DIG. 65

[56] References Cited

U.S. PATENT DOCUMENTS

| | | | |
|---|---|---|---|
| 3,660,635 | 5/1972 | Liebert | 392/387 |
| 3,937,920 | 2/1976 | Gundacker et al. | 392/327 |
| 3,944,785 | 3/1976 | Eaton-Williams | 392/326 |
| 4,196,341 | 4/1980 | Williams | 392/325 |
| 4,979,643 | 12/1990 | Lipisko et al. | 222/83 |
| 5,060,560 | 10/1991 | VanDeMark | 392/401 |

*Primary Examiner*—Sang Paik
*Attorney, Agent, or Firm*—Robert C. Kain, Jr.

[57] ABSTRACT

The control system for a humidifier, which is part of a heat, ventilation or air conditioning HVAC system, detects the level of water and generates control signals by detecting the capacitance of the water in the humidifier. These control signals are used to fill the humidifier with water and control heater elements and, to some degree, drain cycles. A capacitor is utilized to detect the change in capacitance as the water level changes. The control circuit, coupled to the capacitor, generates fill control signals based upon first and second predetermined capacitive levels. In one embodiment, the capacitor sensor includes an electrically conductive element extending into the water as a first electrode which is shielded by an insulating cover, where the water acts as a medium through which capacitance is measured and the humidifier casing or another electrically conductive element in the water functions as the second electrode for the capacitor. Further refinements of the control system include a converter which converts the capacitive value of the capacitor into a frequency signal and a microprocessor which monitors that frequency signal to determine the capacitive level and hence the water level. Increasingly higher frequencies represent increasingly lower water levels. In an enhanced version, the control system further includes an electrically conductive sensor mounted in an interior top region of the humidifier for detecting the presence of foam thereat. When the capacitive sensor detects normal water levels and the conductive sensor mounted above normal water level detects foam, the microprocessor triggers corrective action. Corrective action consists of turning OFF power to the heater elements and initialing a drain cycle to clean out the critical level of impurities which created the foam. In another enhancement, the control system is configured as an adaptive feedback drain control system.

45 Claims, 5 Drawing Sheets

FOAM, DRAIN AND FILL CONTROL SYSTEM FOR HUMIDIFIER

The present invention relates to a humidifier control system, and a method therefor, for controlling foam and establishing drain and fill cycles in a humidifier that supplies humidified air for a heat, ventilation or air conditioning (HVAC) system in a building.

BACKGROUND OF THE INVENTION

Humidifiers are sometimes utilized in HVAC systems in order to provide humidified air for the system and the occupants of the building. Particularly in northern climates which require heated air pumped through the building, it is sometimes necessary to humidify the air in order to create a pleasant work environment for the occupants of the building.

Typical humidifiers utilize a large tank or container, sometimes called an evaporation chamber, (ranging in size from approximately 9 inches in diameter (or smaller) to approximately 34 inches on a side for a square humidifier chamber) which holds water. Heating elements are commonly disposed at positions such that the elements are under water. When the HVAC system requests humidified air (based upon a user controlled humidistat signal or a humidifier ON control signal), the heating element is turned on, the water boils and humidified air is supplied to the HVAC duct system in the building. The humidified air leaves the humidifier when the pressure in the humidifier exceeds the static P.S.I. in the HVAC duct work. Sometimes, humidified air is pulled from the humidifier via a fan box. At other times, the humidified air is injected into the system by the pressure differential between the humidifier and the HVAC duct system.

Water is customarily supplied to the humidifier as pressurized city water. Other water supply systems may be utilized such as pump driven systems. Accordingly, when the heater or heating coil raises the temperature of the water to its boiling point, the water, or portion thereof, changes to steam and the steam, after being mixed with air in the HVAC duct system, becomes humidified air. Since impurities commonly found in the water supply build up in the humidifier, due to the continued evaporation of $H_2O$ molecules, the water captured by and retained in the humidifier becomes increasingly contaminated with impurities, which may be minerals and salts, initially found in trace amounts in the water supply. The increasing concentration of impurities generates foam when the water in the humidifier is boiled.

Since the $H_2O$ molecules are converted into steam, the water level in the humidifier continually decreases. At some point in time, the water level in the humidifier drops to an unacceptable level which exposes a significant portion of the heating elements. Heater elements operate at about 60–70 WATTS per square inch. When this occurs, the heating elements primarily heat the air in the humidifier box or container rather than the water. Hence, the temperature of the air in the humidifier unit increases and there is an increased risk of fire or other thermal damage to the HVAC system, the associated control system and the building. When the heater transfers most of its thermal energy to the water (the water acts as a heat sink), the temperature in the humidifier is about 100° C., plus or minus 2 or 3 degrees. Thermal conditions in excess of 104 degrees C. are not acceptable.

In order to avoid this thermal run-away problem, prior art or pre-existing humidifier control systems utilize conductivity sensors to determine the level of water in the humidifier. Conductivity sensors are triggered when the resistance to ground is lower than a predetermined threshold and are designed to be activated by water in the humidifier. However, with the creation of significant amounts of foam, the foam is an effective conductor of the electricity. Since the foam is conductive, the humidifier control system may detect "false high levels" of water in the humidifier system. If a false high level of water is detected due to foam and the water drops below the heater elements, the system will experience significant thermal damage.

In order to avoid these problems, prior art or pre-existing humidifier control systems drain the humidifiers of water to remove water with a high concentration of impurities based upon a predetermined drain cycle time. For example, in an area having water with a high level of impurities, a large humidifier may be drained and refilled with fresh water every four hours. The same humidifier, when supplied with purer water, may be drained every six hours. The difference between the two systems is the level of impurities in the water. It is known that impurities cause foam in humidifiers. Further evaporation and decreasing water levels increase the impurity level of the water remaining in the humidifier. This, in turn, generates greater amounts of foam, increasing the risk of false high water readings from conductive sensors and potentially dangerous thermal conditions.

However, since stable thermal conditions are required, the fill and drain cycles are set for shorter time periods than necessary. As a result, humidifier systems using these "closed" or "fixed" drain cycles utilize a considerable amount of energy. In addition to flushing and draining the water from the humidifier, the newly added water must be reheated to the boiling point (100° C.) in order to provide humidified air to the HVAC system.

In addition to the foregoing, the prior art systems could not detect large amounts of foam near the top air flow ports of the humidifier. Under certain conditions, the foam sometimes leaves the humidifier with the humidified air and is launched into other parts of the HVAC system.

Mechanical systems which detect the water level utilize floats and lever arms are also known. These mechanical systems are subject to corrosion and mechanical failures. The thermal cycling of the humidifier also adversely effects mechanical sensing systems. Further, mechanical systems do not detect the level of foam.

If the humidifier system utilizes pure or demineralized water, conductive sensors do not work because pure water is not electrically conductive. Accordingly, mechanical water level sensors must be used and the humidifier control systems must be altered to accept these inputs.

Some prior art or pre-existing systems utilize bimetallic temperature sensors mounted on the humidifier casing to detect a thermal run-away condition. These temperature sensors are not commonly disposed in the humidifier because the sensors are adversely effected by the water, heat and impurity levels in the humidifier.

OBJECTS OF THE INVENTION

It is an object of the present invention to provide a control system for a humidifier.

It is a further object of the present invention to provide a foam, drain and fill control system, and methods therefor, for a humidifier.

It is another object of the present invention to provide a humidifier control system which detects the water level in the humidifier based upon the water level and controls the humidifier based upon the capacitance of the water in the humidifier rather than the conductance of the water and/or foam.

It is another object of the present invention to provide a control system which is not affected or influenced by the foam in the humidifier.

It is an additional object of the present invention to avoid falsely detecting a high water level through the use of a capacitive probe that is not significantly affected by the presence or absence of foam in the humidifier.

It is a further object of the present invention to utilize a capacitor sensor in combination with a conductive sensor in order to detect water level and unacceptably high levels of foam in a humidifier.

It is another object of the present invention to provide an adaptive feedback control system which triggers the drain cycles based upon the water level and the presence or absence of foam in the humidifier thus increasing the efficiency of the unit.

It is a further object of the present invention to provide a unified control system which can be utilized with demineralized or purified water or impure water and avoid the use of mechanical systems to detect water level.

It is another object of the present invention to provide a sensor, coated with a plastic, such as TEFLON, such that the sensor probe does not undergo galvanic or other corrosive reaction and such that mineral deposits do not accumulate on the body of the sensor. This sensor is part of the capacitive sensor unit.

It is an additional object of the present invention to utilize an electronic temperature sensor, inside the humidifier, to quickly detect excessive thermal conditions in the humidifier.

SUMMARY OF THE INVENTION

The control system for a humidifier (which is part of a heat, ventilation or air conditioning HVAC system), in one embodiment, detects the level of water and, generates control signals, e.g. fill control signals, to fill the humidifier with water, by detecting the capacitance of the water in the humidifier. A capacitor is utilized to detect the change in capacitance as the water level changes. The control circuit, coupled to the capacitor, generates necessary control signals. These control signals include fill control signals based upon first and second predetermined capacitive levels. In one embodiment, the capacitor sensor includes an electrically conductive element extending into the water as a first electrode, which is shielded by an insulating cover, and the water acts as a medium through which capacitance is measured. The humidifier casing (an electrical ground) or another electrically conductive element in the water functions as the second electrode for the capacitor. Further refinements of the control system include a converter which converts the capacitive value of the capacitor into a frequency signal and a microprocessor which monitors that frequency signal to determine the capacitive level and hence the water level. Increasingly higher frequencies represent increasingly lower water levels. In an enhanced version, the control system further includes an electrically conductive sensor mounted in an interior top region of the humidifier for detecting the presence of foam thereat. When the capacitive sensor detects normal water levels and the conductive sensor mounted above normal water level begins conducting, the microprocessor or controller concludes that foam is present, thereby triggering corrective action. Corrective action consists of turning OFF power to the heater elements and initialing a drain cycle to clean out the critical level of impurities which created the foam. In another enhancement, the control system is configured as an adaptive feedback drain control system. Water is drained from the humidifier based upon either an initial drain cycle time or the detection of excessive amounts of foam. Essentially, the time between drain cycles is controlled by the programmed time period or by detection of foam, whichever is shorter in duration. If the drain cycle is initiated by the detection of foam, the microprocessor calculates the time from the previous drain cycle to the time that foam has been detected and resets the drain cycle time period to equal the calculated time less a predetermined period, e.g. 20 minutes. Consequently, each preprogrammed drain cycle time is incremented a small period, e.g.. five minutes, until foam has been detected again. As a result, the control system maximizes drain cycle time until foam is excessively created by the humidifier.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to a control system for a humidifier.

Figures 1, 2, 3A, 3B, 4A, 4B, 5, 6:
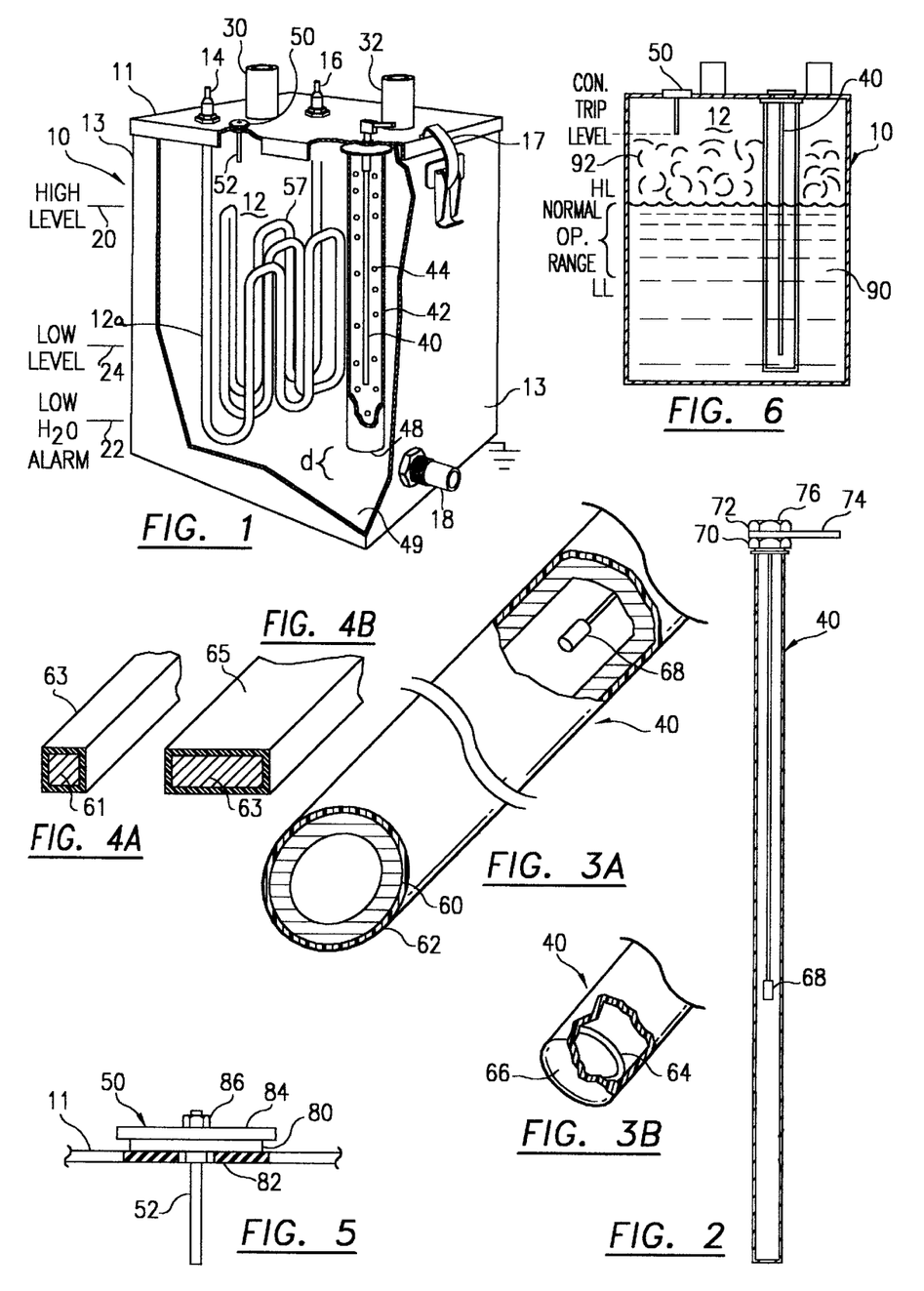
FIG. 1 diagrammatically illustrates an evaporation chamber for a humidifier including the capacitor and a conductive sensor in accordance with the principles of the present invention.
FIG. 2 diagrammatically illustrates the first electrode of the capacitor and the electronic backup temperature or RTD sensor.
FIGS. 3A and 3B diagrammatically illustrate a detailed view of the first electrode of the capacitor and the backup temperature sensor.
FIGS. 4A and 4B diagrammatically illustrate other electrode designs for the capacitor sensor.
FIG. 5 diagrammatically illustrates one embodiment of the conductive sensor.
FIG. 6 diagrammatically illustrates the humidifier filled with water and partially filled with foam.

FIG. 1 diagrammatically illustrates humidifier 10 and particularly an evaporation chamber for a humidifier system. Humidifier 10, sometimes called an evaporation chamber, is designed to capture and retain, in an interior region 12, a relatively significant amount of water. See FIG. 6. In a more general sense, the humidifier includes an evaporation tank that holds water, a control space for the humidifier controls and an exterior cabinet enclosing these sub-systems. For simplicity herein, the evaporation chamber is sometimes referred to as a humidifier. Humidifier 10 (FIG. 1) includes heating elements 12a electrically connected to heater control and power terminals 14, 16. Water is pumped or fed into and drained from humidifier 10 via water port 18. In an ideal situation, humidifier 10 is filled with water to high level 20. Particularly when water reaches lower alarm level 22, heater 12a is turned ON. Water then fills interior space 12 of humidifier 10 and passes low level 24. When the water level reaches high level 20, the control circuit (not shown) turns OFF the fill control valve (not shown). Since heater coils 12a are generating heat, the water in humidifier 10 reaches the boiling point (100°C.) and $H_2O$ molecules are changed into steam. The steam leaves one or both of HVAC ports 30, 32 which are in fluid communication with the air ducts in the HVAC system. When the water reaches low level 24 due to evaporation, a fill ON control signal is generated and the fill control valve is open. The humidifier is then restocked or resupplied with water until the water reaches high level 20. Humidifier 10 includes top 11 which is securely fastened via clamp downs 13. Humidifier box or container 10 may be as small as 9 inches in diameter (a cylindrical container, not shown) or may be as large as 34 inches on a side in a square humidifier.

In order to detect the amount of water in humidifier 10, the present invention utilizes a capacitor or a capacitive sensor. The capacitor includes a first electrode 40 that is vertically oriented and extends into the water. In order to mechanically and hydraulically protect capacitor electrode 40, a shield 42 is placed about capacitor electrode or element 40. It is believed that electrically conductive, metallic shield 42 effectively operates as the capacitor's second electrode. However, since the shield 42 is mechanically and electrically connected to the humidifier casing, the casing also acts as the second electrode for the capacitor sensor. The casing is the humidifier ground.

In order to enhance the flow of water and permit access to that water by capacitor element 40, shield 42 has a plurality of holes or apertures therein, one of which is aperture 44. In the present embodiment, capacitor electrode 40 has an outside diameter of approximately 0.25 inches. Shield 44 is made of stainless steel and is approximately one inch in diameter. The invention is not limited to capacitor electrodes of the shape or size specified herein. Similarly, the invention is not limited to the shield 42 size or shape. The primary purpose of shield 44 is to minimize the mechanical stress on capacitor electrode 40 due to the violent boiling action of water in interior chamber 12 of humidifier 10. However, the electrical characteristics of the shield and the shield's position relative to the sensor probe 40 contribute to the sensitivity and long term operability of the system. Shield 44 acts as a mechanical filter to the violent boiling water. Shield 42 has an open bottom 48 which is spaced a distance d from floor 49 of humidifier 10.

In order to detect high levels of foam in interior space 12 of humidifier 10, a conductive sensor 50 is mounted on top 11 of humidifier 10. It should be noted that conductive sensor 50 may be mounted at any other convenient location as long as sensor rod 52 protrudes into a top region of interior space 12 defined by humidifier 10. In the present embodiment, conductive sensor rod 52 extends approximately 3 inches into interior space 12.

FIG. 2 diagrammatically illustrates capacitive electrode 40. Referring to FIGS. 3A and 3B, capacitor electrode or element 40 is configured, in the illustrated embodiment, as a metal tube 60 covered with a plastic insulator 62. The lower end 64 of tube 60 is closed with insulator 66. In a preferred embodiment, insulator 62 is made of TEFLON which is shrunk onto tube 60.

It should be noted that the capacitor sensor electrode may be configured in other shapes such as the square rod 61 shown in FIG. 4A or the rectangular plate 63 shown in FIG. 4B. Rod 61 and plate 63 are covered with an insulating plastic material 63, 65.

Returning to FIG. 2 and FIG. 3A, as a safety backup, a temperature sensor or RTD sensor 68 is disposed approximately vertically aligned with the plurality of upper ends 57 of heating elements 12 and in the longitudinal extent of tubular capacitive electrode or element 40. The placement of an electronic sensor in the lumen of tube electrode 40 enhances the sensitivity of the temperature probe and the speed of response to unfavorable thermal conditions in the humidifier. Returning to FIG. 1, the end of the RTD sensor 68 is disposed near a significant plurality of apertures or holes 44 in mechanical shield 42. This enables the RTD sensor to better monitor the overall temperature of humidifier 10. RTD sensor, in a working embodiment, is a Model 8288 platinum RTD electronic temperature sensor manufactured by Enercorp Instruments Ltd. of Islington, Ontario, Canada.

Plastic insulator 62 covers the entire capacitor electrode 60 even as that metal electrode protrudes through top 11 of humidifier 10. Mechanical connectors such as specially configured nuts 70, 72 maintain the electrical isolation between metal electrode 60 and the generally electrically grounded body 13 of humidifier 10. A small circuit board 74 protrudes from top end 76 of capacitor electrode 40. As explained later in connection with FIG. 8, metal electrode element 60 is connected to a converter circuit (which converts capacitive levels into frequencies via an oscillator) mounted on circuit board 74.

FIG. 5 diagrammatically illustrates conductive sensor 50 which is mounted on top cover 11 of humidifier 10. Conductive sensor 50 includes the metallic, electrically conductive rod 52 that is electrically isolated via insulating washer element 80 and insulating ring 82 from the generally conductive top 11 of humidifier 10. Top 11 of the humidifier is electrically grounded. Contact plate 84 and nut 86 mount conductive sensor 50 onto top 11.

FIG. 6 diagrammatically illustrates humidifier 10 partially filled with water 90. Water 90 has a normal operating range between high water level HL and low water level LL. When capacitive sensor 40 and the associated control system detects water level lower than LL, the control system opens the fill valve or issues a fill control ON signal to the fill valve. Water is then pumped or forced into interior 12 of humidifier 10 until capacitive sensor 40 determines that the water level reaches high level HL. At that time, the humidifier control system issues another fill control command turning the fill valve OFF.

FIG. 6 also shows foam 92 floating or present atop water 90. Foam 92 is shown at a level beneath the conductive trip level for conductive sensor 50. When foam 92 increases to a level above conductive trip level, the conductive sensor 50 turns ON thereby indicating an unacceptably high level of foam in humidifier 10. Foam is generally electrically conductive and the sensor determines that an electrical circuit has closed when foam reaches rod 52. The conductive circuit is closed between conductive rod 52 and the humidifier ground by the presence of water or foam therebetween. As discussed later, this conductive signal triggers a heater OFF control command and, in some instances, a drain initiation cycle to drain water 90 from humidifier 10 and refill the humidifier with clean, essentially non-contaminated water. As discussed earlier, foam 92 is created due to the increasingly higher concentrations of impurities in water 90 due to the evaporation of $H_2O$ molecules from the water in the humidifier tank.

Figure 7:
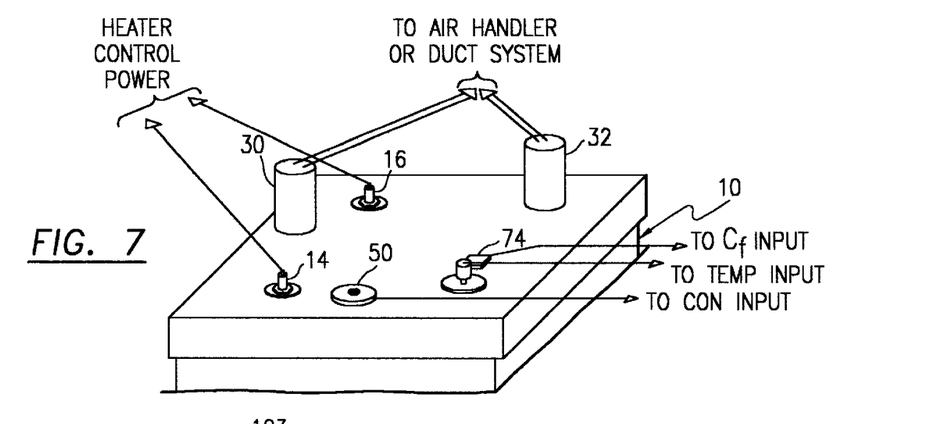
FIG. 7 diagrammatically illustrates electrical and HVAC connections to the humidifier.

FIG. 7 diagrammatically illustrates electrical and humidified air inputs and outputs to humidifier 10. Humidified air ports 30, 32 feed humidified air to an air handler (or fan box, not shown) or an HVAC duct system. Heater control and power control signals are supplied to heater terminals 14, 16. The conductive sensor 50 establishes a conductive control or CON input for the control circuit. A small circuit board 74 generates a frequency signal $C_f$ which is applied to a further control circuit and which represents the capacitive value or level based primarily upon the water level in humidifier 10. Also, the temperature output signal from the RTD sensor is supplied to the temperature input of the further control circuit.

Figure 8:
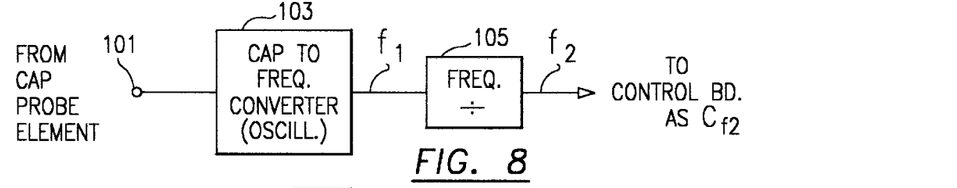
FIG. 8 diagrammatically illustrates one type of electrical circuit to convert the variable capacitive signal to a frequency signal.

FIG. 8 diagrammatically illustrates one type of signal conditioning circuitry for the capacitive signal established by metal electrode 60 of capacitive element 40. Terminal 101 is electrically connected to the metal tube or metal rod or plate or bar 60, 61, 62 shown in FIGS. 3A, 4A and 4B. An oscillating circuit 103 converts the capacitive level signal to a frequency signal. The output of converter 103 $f_1$ is applied to a frequency divider circuit 105. The output $f_2$ is applied as signal $C_f$ to the control system described later in conjunction with FIGS. 9 and 10. The following table provides some exemplarly data showing the length of the tube, the size of the humidifier tank and the frequency values for $C_f$. In the following table, the term "control level" is the equivalent of Low Level in FIG. 6. Also the following table entitled "Analog Input Table" provides some abbreviations utilized in conjunction with system diagram in FIG. 10.

Exemplary System Parameters Table

| Small Tank | | Tube length 8" |
|---|---|---|
| 7.6 m sec | High Level | (131.6 Hz) |
| 7.12 m sec | Control Level | (140.4 Hz) |
| 6.6 m sec | Alarm Level | (151.5 Hz) |
| Medium Tank | | Tube length 12" |
| 9.16 m sec | High Level | (109 Hz) |
| 8.4 m sec | Control Level | (119 Hz) |
| 7.76 m sec | Alarm Level | (128.8 Hz) |
| Large Tank | | Tube length 12" |
| 9.87 m sec | High Level | (101.3 Hz) |
| 9.36 m sec | Control Level | (106.8 Hz) |
| 8.72 m sec | Alarm Level | (114.6 Hz) |
| No Water | | |
| Frequency to Microprocessor about Tube Parameters | | 454 Hz |
| Exemplary wall thickness | | 0.028" |
| Exemplary outside diameter | | 0.25" |

Analog Input Table

RH — Relative humidity sensor signal (either program or manual humidistat control input)
Sys. Cont. — Humidistat control signal
High Limit — High limit humidistat control signal
Temp. — Temperature sensor (e.g. outside building temperature sensor signal)

The control system of the present invention provides several functions. The capacitor can be utilized to monitor the true water level 90 in humidifier 10 and generate appropriate control signals. These control signals may control water supply, drain cycle, heater control (ON, OFF and variable heater control signals) and other controls. Additionally, the control system can utilize the capacitor and the electrically conductive sensor to generate fill, drain and heater control signals. Fill control signals are generated based upon at least two and most likely three capacitive levels established by the capacitor. Drain control signals are triggered by the detection of a electrically conductive media such as "foam" between conductive sensor tip 52 and the humidifier electrical ground. Heater control signals are also generated by the conductive sensor output going high or turning ON. Thirdly, the control system can be configured with an adaptive feedback loop to adaptively drain and replenish the water level in the humidifier. As discussed earlier, the humidifier control system is initially preprogrammed to drain and replenish the water at a predetermined time period. However, an adaptive drain control system can be utilized which is triggered to reduce or increase that predetermined drain time cycle based upon time cycles triggered by the output of the capacitor and the conductive sensor. Essentially, when the conductive sensor goes ON within a time frame less than the preprogrammed drain cycle time, the adaptive drain control feature reduces the drain control cycle time. Alternatively, the preprogrammed drain control cycle can be incrementally increased (e.g.. by five minute periods) in the absence of the conductive sensor going ON (thereby indicating an excessive amount of foam in the humidifier tank) during a preprogrammed drain control cycle time thereby reducing energy consumption and water consumption. If the drain cycle time can be increased 20–30% (the control system could be preprogrammed to establish a maximum drain cycle time), a relatively significant energy savings can be obtained from the humidifier system. Energy is saved because water in the humidifier is not prematurely drained and the newly supplied water need not be heated to the boiling point. Essentially, the longer the water stays in the humidifier, the more efficient the humidifier system.

It should be noted that although a microprocessor-based control system is discussed in detail herein, the present control system can be configured with analog components.

Figure 9:
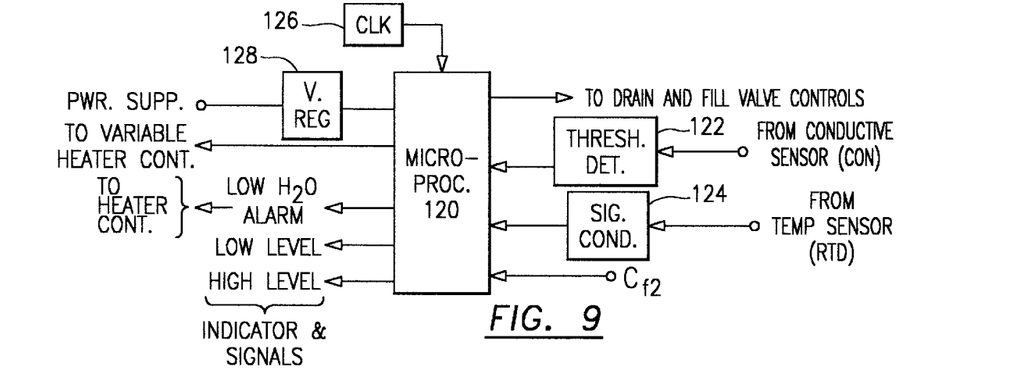
FIG. 9 diagrammatically illustrates major functional elements of the control circuit and particularly illustrates a microprocessor-based control circuit.
Figure 10:
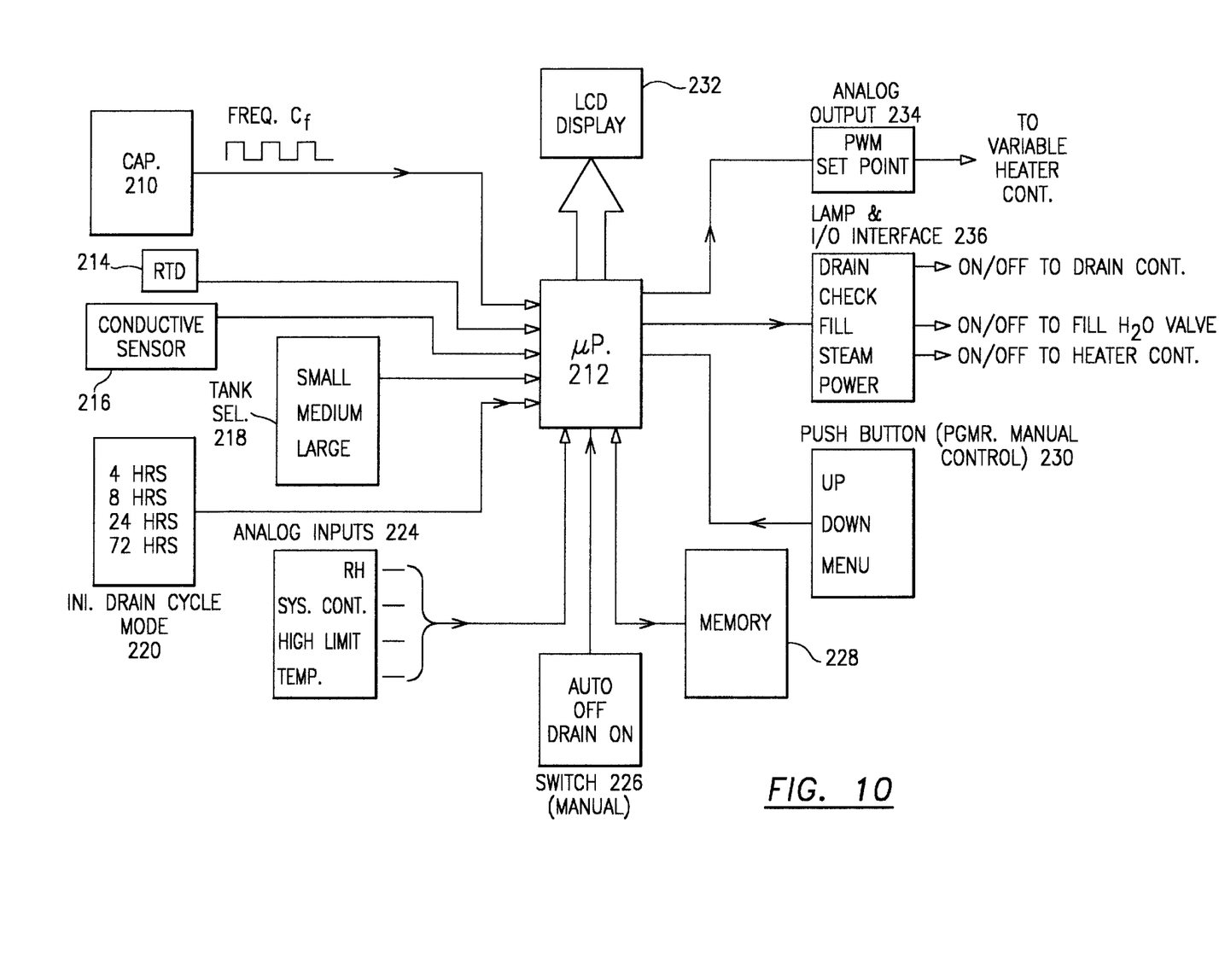
FIG. 10 diagrammatically illustrates, as a functional block diagram, the microprocessor-based control system.

FIGS. 9 and 10 diagrammatically illustrate functional block diagrams for the microprocessor-based control system. In FIG. 9, microprocessor 120 is supplied with signals from the conductive sensor, a CON signal, from the temperature sensor, an RTD signal, and from the capacitor electrode, a frequency signal $C_{f2}$. The conductive sensor signal CON is applied to a threshold detector 122. Threshold detector 122 may be an op amp, various other amplifiers and filters and, such that the output of the threshold detector 122 is simply a high or a low signal representing the presence or absence of foam(respectively, low or high conductivity).

The output from temperature sensor RTD is applied to signal conditioner circuit 124. These signal conditioner circuits are well known in the industry. The output of the signal conditioner 124 is applied to an appropriate input on microprocessor 120. The frequency signal representing the capacitance of the water level in humidifier 10 is applied as signal $C_{f2}$ to microprocessor 120. A clock signal from clock 126 is also applied to microprocessor 120 as is power from voltage regulator 128.

The output of the capacitor is represented by a frequency signal which is established by the converter 103 (FIG. 8). The converter is an oscillator formed as a resistive-capacitive circuit or RC circuit. The capacitive level of the capacitor is measured between the capacitive electrode sensor 40 and the mechanical shield 42 which is electrically coupled to the humidifier ground and to electrically conductive outer casing 13 of humidifier 10 (see FIG. 1). The water in the humidifier is the medium through which capacitance is measured. When the grounded mechanical shield 42 surrounds capacitive sensor probe 40, the capacitive level signal is primarily a measurement of the water between probe 40 and shield 42. The RC circuit configured as converter and oscillator 103 generates a high frequency signal when the water level drops in humidifier tank 10. Higher frequencies correspond to lower water levels. Conversely, lower frequencies represent higher water levels. In another embodiment, shield 42 may not be connected to the humidifier ground. In this situation, capacitance is measured between sensor probe 40, shield 42 and the intervening water.

As discussed herein, during the initial fill cycle, when the water reaches low $H_2O$ alarm level 22 (FIG. 1), microprocessor 120 issues a heater ON command. This is shown in FIG. 9 as the output of low $H_2O$ alarm. Additionally, microprocessor 120 may issue variable heater control signals to the heater in the humidifier. It should be noted that some heaters only accept ON and OFF signals. Other heaters will accept pulse width modulated or PWM control signals which signal an increase or decrease in the thermal activity of the heater based upon increasing or decreasing PWM signals applied to the variable heater control input. When the water reaches High Level, a predetermined frequency level is detected by monitoring signal $C_{f2}$ and microprocessor 120 issues a fill control OFF signal to the fill valve control. The humidifier system then operates in a normal range until the water reaches Lower Level (FIG. 6). This lower level is sometimes referred to herein as a Control Level. At that time, microprocessor 120 senses that water level via the frequency of capacitive signal $C_{f2}$ and issues a fill ON control signal to the fill valve control. This signal opens the valve and water is supplied to the humidifier tank. The system operates within this normal operating range turning the fill valve OFF and ON as necessary.

At a predetermined drain cycle time or as adaptively established by the microprocessor and the output of the conductive sensor, a drain cycle is initiated by microprocessor 120. During this drain cycle, the heater is turned OFF, the fill valve is turned OFF and the drain valve is opened with a drain control ON signal. As the water drains, microprocessor 120 monitors the level of the water via the capacitive electrode 40. When the frequency reaches a sufficiently low level and after the expiration of a predetermined additional drain time, microprocessor 120 issues a drain close signal or drain OFF signal, issues a fill valve open or ON signal and refills the humidifier with water. When the water exceeds low $H_2O$ alarm signal 22 (FIG. 1) the heater is turned ON. When the water reaches the high level 20 (FIG. 1) or HL, the fill valve is turned OFF and the system operates within the normal range.

FIG. 10 diagrammatically illustrates a functional block diagram of the control system. The capacitive sensor and signal conditioning circuitry (FIG. 8) is functionally illustrated as capacitor block 210. Capacitor block 210 generates a frequency signal $C_F$ which is applied to microprocessor 212. The temperature signal from RTD sensor 214 is also applied to microprocessor 212. In the functional block diagram of FIG. 10, conditioning circuitry, amplification and other signal processing components are incorporated into the functional blocks. Conductive sensor functional block 216 also supplies a input signal to microprocessor 212.

The installer or operator selects an input on tank selection block 218 such that the microprocessor 212 can identify the size of the humidifier (small, medium and large) controlled by the system. The installer and/or operator also establishes the initial drain cycle time and mode 220 by selecting the appropriate input. The initial drain cycle time may be 2–72 hours. As described earlier, this setting primarily depends upon the level of impurities in the water supplied to the humidifier, the size of the humidifier and the duty cycle or heater ON-OFF cycle time for the system. Analog inputs 224 are also supplied to microprocessor 212. The Analog Input Table discussed above provides Relative Humidity RH either as a sensor signal or as a preprogrammed signal supplied to the microprocessor 212. Further, the Relative Humidity RH signal may be the difference between a manual setting on a humidistat control and the actual sensed humidity at the humidistat. The system control is also a humidistat control signal. The high limit analog input is generally established by the installer and/or user and establishes the high or upper limit of the humidistat. Typically, the high limit humidistat analog signal is generated by a humidistat sensor located in the HVAC duct system. The temperature is either an outside temperature control or other system control that reduces the humidistat control readings based upon the sensed temperature. When the outside temperature reaches a certain level, the humidity inside the building should be controlled in order to reduce and/or eliminate condensation on the windows of the building. Analog signals are converted into digital signals by appropriate A to D converters as necessary. Switch function block 226 enables the user to place the control system on automatic, to turn OFF the control system or to turn the drain ON.

Microprocessor 212 utilizes memory 228 in order to process these input signals, store programs and settings and generate appropriate output signals.

Microprocessor 212 also includes a programmer's manual control 230. In one embodiment, this programmer's control is a push button that enables the programmer-installer-user to scroll up, down or to select a new menu option. Essentially, data and menu selections are displayed on LCD display or another type of common microprocessor display unit 232.

Microprocessor 212 generates a variable heater control signal classified as analog output 234. This variable heater control signal is a pulse width modulated PWM control signal which is based a predetermined set point. Further, microprocessor 120 generates drain control signals which are either ON and OFF, fill control signals which are either ON or OFF and heater control signals which are either ON or OFF. Of course, proportional controls may be generated if necessary. For example, PWM control signals are proportional control outputs.

The lamp and input/output interface 236 provides two functions. First, lamps notify the installer and user that the drain control signal is either ON or OFF, notify the user that the user should call service (this is the "light" ON condition in lamp and I/O interface 236), notify the user-installer that the fill control signal is either ON or OFF, notify the user that the heater is either ON or OFF (showing steam generation by the system) and also notify the user whether the power is being supplied to the control circuit.

Figure 11A:
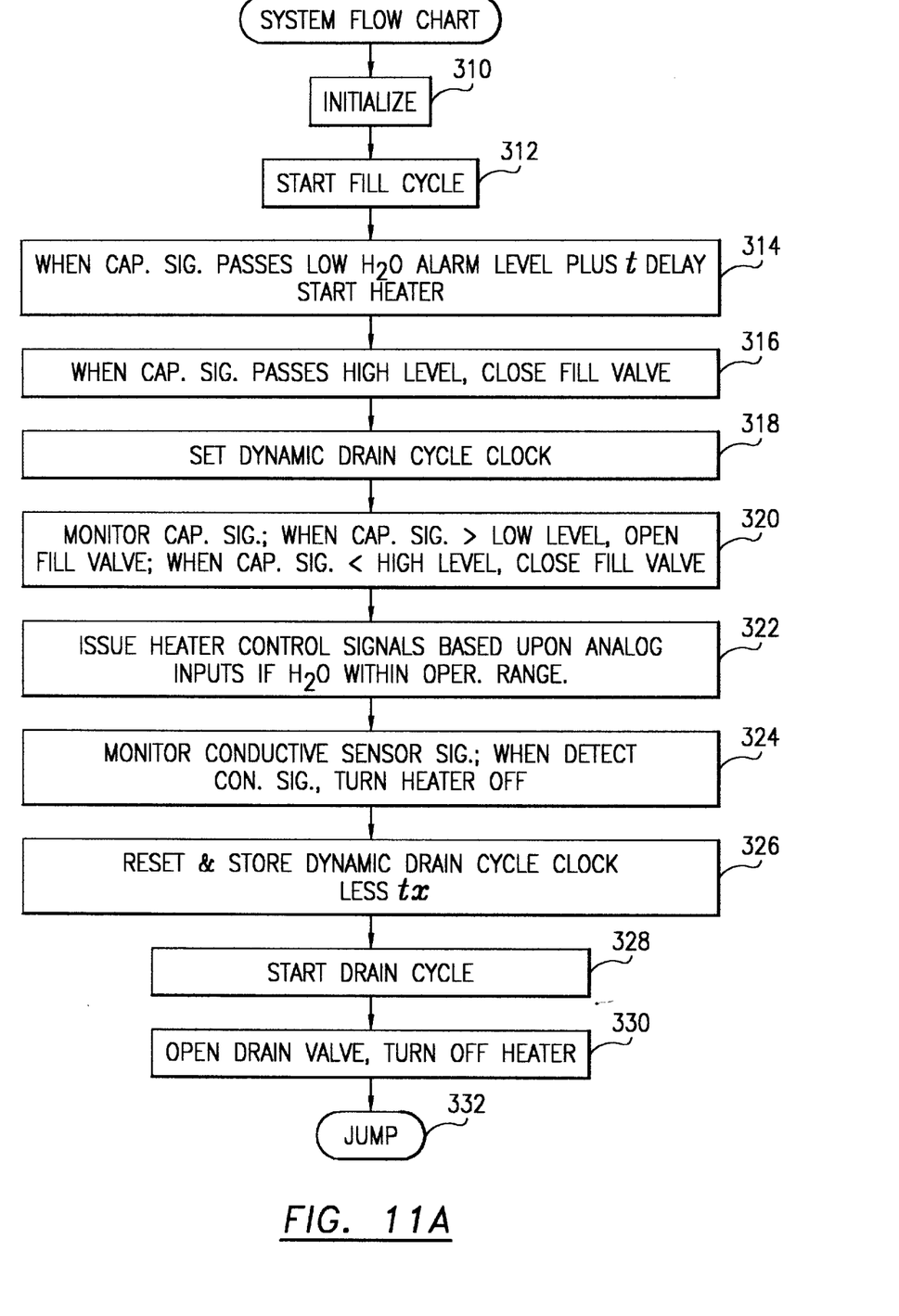
FIGS. 11A and 11B diagrammatically illustrate a system flow chart showing the major functional elements of the computer program operating the microprocessor-based control system; and, FIG. 12 diagrammatically illustrates an analog control system in functional block diagram form.
Figure 11B:
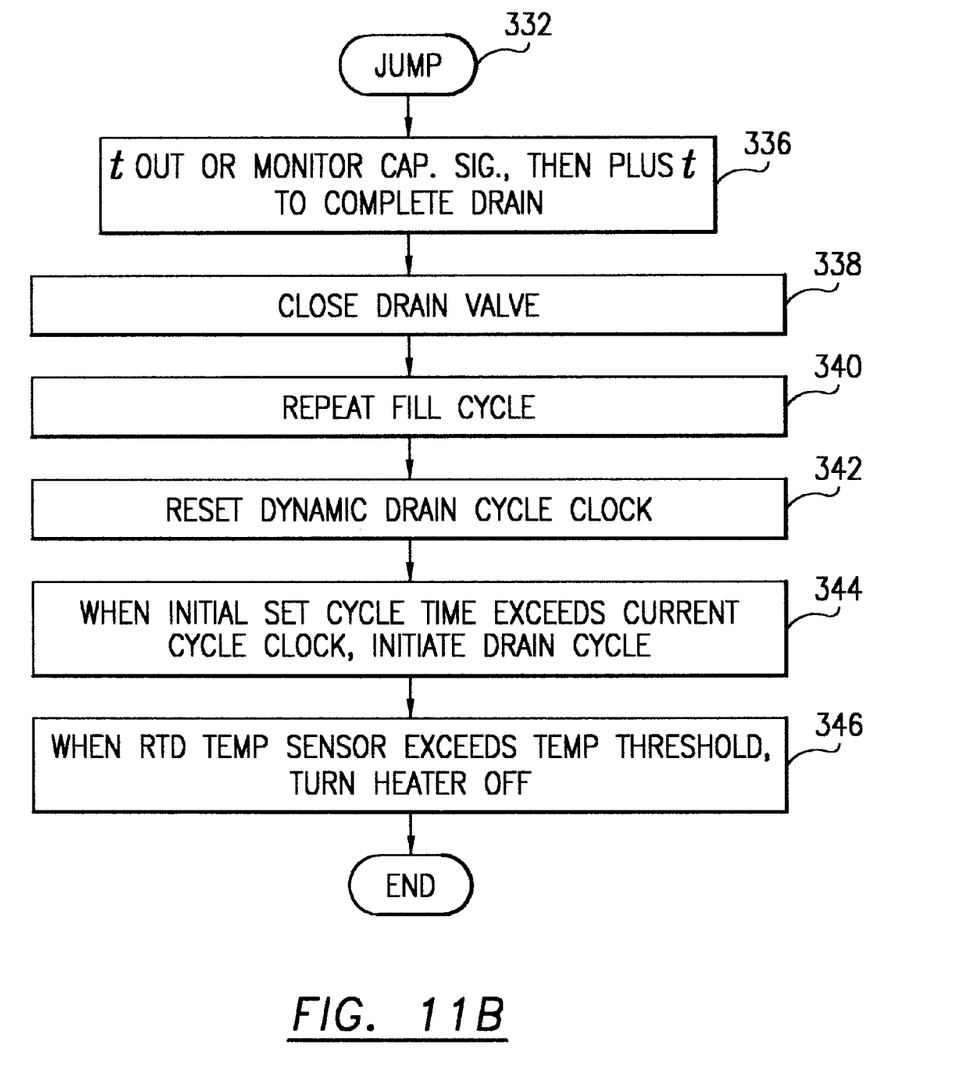

FIGS. 11A and 11B diagrammatically illustrate major functional aspects of the system flow chart. In step 310, the microprocessor initializes the various interfaces and sensors. Appropriate electrical tests may be conducted on the sensors, lamps, indicator lights, LCD displays and other electrically coupled elements. In step 312, the system initiates a start fill cycle. In this cycle, the fill valve is opened with a fill control ON signal and water is supplied to the humidifier container. In step 314, a determination is made that the capacitive signal passes the low $H_2O$ alarm signal plus a predetermined time delay. At this point, a heater ON signal is generated by the microprocessor. In step 316, a determination is made that the capacitor signal passes the High Level. The microprocessor then issues a fill control signal closing the valve and represented by a fill OFF control signal. In step 318, the control system sets a dynamic drain cycle clock. The term "dynamic" is utilized herein to describe the drain cycle clock which adaptively changes based upon the particular "foaming conditions" generated by the humidifier. In step 320, the output of the capacitor sensor is monitored. When the capacitive signal is greater than the Low Level (FIG. 6), an open or fill ON command signal is generated. When the capacitive signal is less than the High Level, the fill control valve is turned OFF. It should be noted that at this point in time, the control system has triggered certain fill control commands and heater control commands based upon three predetermined capacitive levels established by the capacitor sensor which includes capacitor electrode 40. Of course, only two predetermined levels could be sensed such that the heater is turned ON only after the water level passes Lower Level (FIG. 6).

In step 322, the control system issues heater control signals based upon analog inputs supplied to it from various humidistats, manual controls and other inputs. The heater control signals are generated as long as the water level is monitored as being between Lower Level and High Level. In step 324, the system monitors the conductive sensor 50. When the conductive sensor turns ON, the heater is turned OFF. This sensed conductivity at an upper level in the tank is due to excessive foam at a level greater than the conductive trip level diagrammatically illustrated in FIG. 6. In step 326, the system resets and stores the dynamic drain cycle clock. For example, if the installer initially established eights hours as the initial drain cycle time mode (FIG. 10), and the conductive sensor turned ON at six hours, the dynamic drain cycle clock would be reprogrammed to six hours less thirty minutes. The thirty minute deduction seeks to avoid further tripping of the conductive sensor. Accordingly, the drain cycle is initiated at five hours, thirty minutes. In this manner, the system establishes an adaptive feedback control which shortens the drain cycle based upon the sensing of excessive foam by conductive sensor 50.

In another sense, the drain cycle could be increased if several drain cycles were executed without tripping the conductive sensor. For example, after three eight hour drain cycles, the microprocessor may add certain predetermined time periods to the drain cycle time until it senses an excessive amount of foam via conductive sensor 50. The drain cycle may be increased by thirty minute increments, e.g.. plus thirty minutes, one hour and up to a maximum of one and half hours from the initial drain cycle time preprogrammed initially at eight hours. This adaptive feedback control increases the energy efficiency of the system. The drain cycle time is incremented until the conductive sensor goes ON due to the detection of foam in the upper region of the humidifier tank.

In step 328, the system initiates the drain cycle. In step 330, the drain valve is opened or turned ON and the heater is turned OFF. The system jumps in jump point 332 to the same jump point in FIG. 11B. In step 336, the system determines when the humidifier has been drained of water. This may occur based on a preprogrammed time out from the beginning of the drain cycle ON signal or may be based upon the value of the capacitive sensor. If the capacitive sensor is utilized, an additional time period may be added in order to complete the drain of water from humidifier 10. In step 338, the drain value is closed or turned OFF. In step 340, the system initiates the fill cycle. This is discussed above in steps 314 and 316. In step 342 after the humidifier is filled with water (e.g.. at level HL.), the system resets the dynamic drain cycle clock. This step corresponds to set cycle clock 318. In step 344, when the current cycle time exceeds the stored drain cycle time, the system initiates the drain cycle. In step 346, the system monitors the temperature or RTD output. When that temperature exceeds a temperature threshold, a heater OFF control signal is issued. This is a backup control system in the event the capacitive sensor and control circuit fails to properly operate. In one embodiment, the temperature threshold is set at 104° C.

Figure 12:
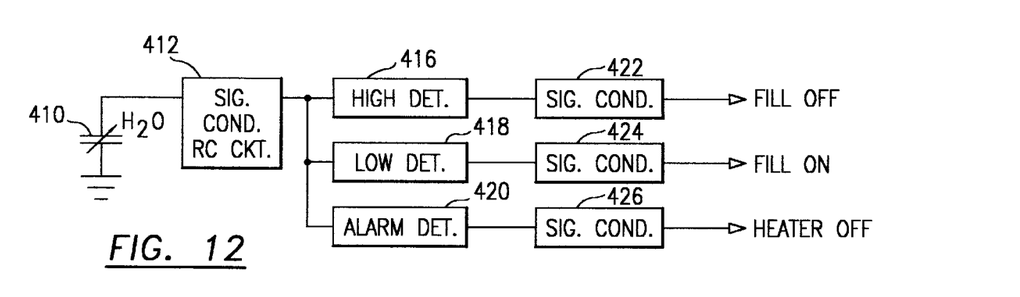

FIG. 12 diagrammatically illustrates an analog version of the control system. Variable capacitor 410 represents capacitive element 40, water 90 and humidifier ground from humidifier casing 13 or mechanical shield 42. The output from variable capacitor 410 is applied to a signal conditioning circuit 412. Essentially, signal conditioning circuit 412 is an RC circuit which converts that capacitive signal into either a voltage, frequency or other easily processed analog data signal. The output of signal conditioner 412 is applied to a high level detector 416, a low level director 418 and an alarm detector 420. The output of high level detector 416 is essentially equivalent to the output at water level HL. The low level detector 418 is activated when the water level falls below level LL in FIG. 6. The alarm detector 420 is activated when the water falls below low $H_2O$ alarm level 22 in FIG. 1. The outputs from these detector circuits 416, 418, 420 are fed to respective signal conditioners 422, 424 and 426. The outputs from signal conditioners 422, 424 and 426 represent a fill OFF command, a fill ON and a heater OFF command. In this manner, the control system can be configured as an analog system rather than a digital or microprocessor-based system.

The present system may be expanded by adding several conductive sensors to detect foam at various vertical positions in the humidifier. Also, rather than a single capacitive sensor electrode 40, multiple, independent electrodes or electrode pairs may be vertically placed on the interior humidifier walls. One or more of these capacitive electrode pairs and one or more conductive sensors may sense free air, foam or water dependent upon the conditions in the system and the vertical position of the foam and/or water.

The claims appended hereto are meant to cover modifications and changes within the scope and spirit of the present invention.

What is claimed is:

1. A control system for a humidifier adapted to be controllably filled and stocked with water, said humidifier providing humidified air for a heat, ventilation or air conditioning (HVAC) system in a building, said control system adapted to generate control signals to fill and heat said water, said humidifier having an electrically conductive casing, the control system comprising:

a capacitor disposed in said humidifier which electrically senses water level in said humidifier, said capacitor including a first electrode extending into said water and an electrically conductive second electrode, said second electrode electrically coupled to said conductive humidifier casing which acts as a capacitive electrode and said water retained by said humidifier is a medium through which capacitance is measured via said capacitor;

a control circuit electrically coupled to said capacitor, said control circuit generating said control signals based upon predetermined capacitive levels of said capacitor.

2. A control system as claimed in claim 1 wherein said capacitor is vertically oriented and extends into said water in said humidifier and said control circuit having means for generating fill control signals based upon first and second predetermined capacitive levels of said capacitor.

3. A control system as claimed in claim 2 wherein said first electrode is a shielded electrically conductive element extending into said water.

4. A control system as claimed in claim 3 wherein said control circuit includes means for converting a capacitive value of said capacitor into a frequency signal, said means for converting coupled to said capacitor, said control circuit further including means for monitoring said frequency signal which represents said water level in said humidifier.

5. A control system as claimed in claim 4 wherein said control circuit includes a processor, said processor including said means for monitoring, and said processor coupled to said means for converting.

6. A control system as claimed in claim 2 wherein said humidifier includes a heater which, during a normal humidification cycle, is disposed under water, said heater operated by heater control signals, said control circuit including means for generating said heater control signals based upon a third predetermined capacitive level of said capacitor.

7. A control system as claimed in claim 5 wherein said humidifier includes a heater which, during a normal humidification cycle, is disposed under water, said heater operated by heater control signals, said control circuit including means for generating said heater control signals based upon a third predetermined capacitive level of said capacitor.

8. A control system as claimed in claim 3 wherein said first electrode of said capacitor is one of a metal tube, a rod and a plate, said first electrode being electrically isolated from said water by an electrical insulator.

9. A control system as claimed in claim 7 wherein said first electrode is one of a metal tube, a rod and a plate, said first electrode begin electrically isolated from said water by an electrical insulator.

10. A control system as claimed in claim 8 wherein said second electrode includes an electrically conductive element configured as a containment element spaced apart from said first electrode and disposed in said water.

11. A control system as claimed in claim 9 wherein said second electrode includes an electrically conductive element configured as a containment element spaced apart from said first electrode and disposed in said water.

12. A control system as claimed in claim 10 wherein the first electrode is an insulated, tubular first electrode and is disposed in a perforated, vertically disposed shield, which defines said second electrode and through which passes said water.

13. A control system for a humidifier adapted to be filled with water and drained of water, said humidifier providing humidified air for a heat, ventilation or air conditioning (HVAC) system in a building, said control system adapted to generate heater control signals for a heater disposed within said humidifier, fill control signals and drain control signals, the control system comprising:

a capacitor disposed in said humidifier which electrically senses water level in said humidifier;

an electrically conductive sensor, mounted in an interior top region of said humidifier, for detecting the presence of foam thereat;

a control circuit electrically coupled to said capacitor and said conductive sensor, said control circuit generating said fill, drain and heater control signals based upon first and second predetermined capacitive levels of said capacitor and a predetermined output of said conductive sensor.

14. A control system as claimed in claim 13 wherein said capacitor is vertically oriented and extends into said water in said humidifier.

15. A control system as claimed in claim 14 wherein said capacitor includes an insulated electrically conductive element extending into said water as a first electrode, one of an electrically conductive element and an electrical ground for said humidifier as a second electrode and said water retained by said humidifier as a medium through which capacitance is measured via said capacitor.

16. A control system as claimed in claim 15 wherein said control circuit includes means for converting a capacitive value of said capacitor into a frequency signal, said means for converting coupled to said capacitor, said control circuit further including means for monitoring said frequency signal which represents said water level in said humidifier.

17. A control system as claimed in claim 16 wherein said control circuit includes a processor, said processor including said means for monitoring, and said processor coupled to said means for converting.

18. A control system as claimed in claim 17 wherein said control circuit includes means, coupled to said conductive sensor, for interfacing between said processor and said conductive sensor, said processor having means for issuing a heater OFF control signal and a drain cycle initiation control signal based upon the presence of said foam sensed by said conductive sensor.

19. A control system as claimed in claim 13 wherein said control circuit includes means for generating said heater control signals based upon a third predetermined capacitive level of said capacitor.

20. A control system as claimed in claim 18 wherein said control circuit includes means for generating said heater control signals based upon a third predetermined capacitive level of said capacitor.

21. A control system as claimed in claim 17 wherein said first electrode is one of a metal tube, rod and a plate electrically isolated from said water by an electrical insulator.

22. A control system as claimed in claim 21 wherein said insulator for said first electrode is made of a plastic material.

23. A control system as claimed in claim 22 wherein said conductive sensor includes means for measuring the resistive path between said foam and said electrical ground for said humidifier.

24. A control system as claimed in claim 23 wherein the first electrode is an insulated, tubular first electrode which is disposed in a perforated, vertically disposed shield through which passes said water.

25. A control system as claimed in claim 24 wherein said first electrode is a metal tube and a temperature sensor is disposed at a heater level inside said tubular first electrode.

26. An adaptive feedback drain control system for a humidifier adapted to be filled with water and drained of water, said humidifier providing humidified air for a heat, ventilation or air conditioning (HVAC) system in a building, said control system adapted to generate fill control signals and drain control signals, the control system comprising:
   a capacitor disposed in said humidifier which electrically senses water level in said humidifier;
   an electrically conductive sensor, mounted in an interior top region of said humidifier, for detecting the presence of foam thereat;
   a control circuit with a timer, said control circuit electrically coupled to said capacitor and said conductive sensor, said control circuit generating said fill control signals based upon first and second predetermined capacitive levels of said capacitor and generating said drain control signals based upon one of a predetermined time period and a predetermined output of said conductive sensor; and,
   means for resetting said predetermined time period to adaptively preclude detection of said foam by said conductive sensor.

27. A control system as claimed in claim 26 wherein said capacitor includes an insulated electrically conductive element extending into said water as a first electrode, one of an electrically conductive element and an electrical ground for said humidifier as a second electrode and said water retained by said humidifier as a medium through which capacitance is measured via said capacitor.

28. A control system as claimed in claim 27 wherein said control circuit includes means for converting a capacitive value of said capacitor into a frequency signal, said means for converting coupled to said capacitor, said control circuit further including means for monitoring said frequency signal which represents said water level in said humidifier.

29. A control system as claimed in claim 28 wherein said control circuit includes a processor, said processor including said means for monitoring, and said processor coupled to said means for converting.

30. A control system as claimed in claim 29 wherein said first electrode is one of a metal tube, rod and a plate electrically isolated from said water by an electrical insulator.

31. A control system as claimed in claim 30 wherein said insulator for said first electrode is made of a plastic material.

32. A control system as claimed in claim 31 wherein the first electrode is an insulated, tubular first electrode which is disposed in a perforated, vertically disposed shield configured as said second electrode through which passes said water.

33. A method of controlling a humidifier filled and stocked with water under the command of fill and heater control signals, said humidifier providing humidified air to a heat, ventilation or air conditioning (HVAC) system in a building, said humidifier having an electrically conductive casing, the method comprising the steps of:
   sensing the capacitance of the water in the humidifier utilizing said casing as a capacitive electrode, said capacitance varying with a water level in the humidifier;
   generating said control signals based upon the sensed capacitance and predetermined capacitance levels.

34. A method as claimed in claim 33 including the step of sensing capacitance by providing an electrically insulated electrode extending through said water and sensing a change in capacitance based upon said water level and generating fill control signals based upon first and second predetermined capacitance levels.

35. A method as claimed in claim 34 including the step of converting said capacitance into a frequency signal and processing the frequency signal to determine when said signal reaches said first and second capacitive levels, the method also including the step of issuing fill OPEN control signals and fill CLOSE control signals at said respective first and second predetermined capacitive levels.

36. A method of controlling a humidifier filled with water and drained of water in accordance with fill control and drain control signals, said humidifier providing humidified air to a heat, ventilation or air conditioning (HVAC) system in a building by heating said water via a heater in said humidifier, said heater operated in accordance with heater control signals, the method comprising the steps of:
   sensing the capacitance of the water in the humidifier, said capacitance varying with a water level in the humidifier;
   sensing a presence of foam in an interior top region of said humidifier by detecting electrical conductivity of the foam thereat;
   generating said fill, drain and heater control signals based upon the sensed capacitance, first and second predetermined capacitance levels, and said presence of said foam based upon a predetermined electrical conductivity level.

37. A method as claimed in claim 36 including the step of sensing capacitance by providing an electrically insulated electrode extending through said water and sensing a change in capacitance that varies with said water level in said humidifier.

38. A method as claimed in claim 36 including the step of converting said capacitance into a frequency signal and processing the frequency signal to determine when said signal reaches said first and second capacitive levels, the method also including the step of issuing fill OPEN control signals and fill CLOSE control signals at said respective first and second predetermined capacitive levels.

39. A method as claimed in claim 38 including the steps of determining when said sensed capacitance reaches a third predetermined capacitance level and generating a heater ON control signal within a predetermined time period thereafter.

40. A method as claimed in claim 39 including the step of generating a heater OFF control signal upon sensing the presence of said foam.

41. A method of controlling a humidifier utilizing an adaptive feedback process, said humidifier being filled with water and drained of water in accordance with fill control and drain control signals, said humidifier providing humidified air to a heat, ventilation or air conditioning (HVAC) system in a building, the method comprising the steps of:
   sensing the capacitance of the water in the humidifier, said capacitance varying with a water level in the humidifier;
   sensing a presence of foam in an interior top region of said humidifier by detecting electrical conductivity of the foam thereat;
   generating said fill control signals based upon the sensed capacitance and a comparison with first and second predetermined capacitance levels;
   timing each fill and drain cycle;
   generating said drain control signals based upon one of detecting said presence of said foam and an expiration of a predetermined time period; and, resetting said predetermined time period based upon a current time for a current fill and drain cycle upon detecting said presence of said foam.

42. A method as claimed in claim 41 including the step of sensing capacitance by providing an electrically insulated electrode extending through said water and sensing a change in capacitance that varies with said water level in said humidifier.

43. A method as claimed in claim 42 including the step of converting said capacitance into a frequency signal and processing the frequency signal to determine when said signal reaches said first and second capacitive levels, the method also including the step of issuing fill OPEN control signals and fill CLOSE control signals at said respective first and second predetermined capacitive levels.

44. A method as claimed in claim 43 wherein said humidifier includes a heater controlled by heater control signals, and the method includes the steps of determining when said sensed capacitance reaches a third predetermined capacitance level and generating a heater ON control signal within a predetermined delay period thereafter.

45. A method as claimed in claim 44 including the step of generating a heater OFF control signal upon sensing the presence of said foam.

* * * * *